United States Patent
Mabie et al.

(10) Patent No.: US 8,954,862 B1
(45) Date of Patent: Feb. 10, 2015

(54) SYSTEM AND METHOD FOR COLLABORATIVE VIEWING OF A FOUR DIMENSIONAL MODEL REQUIRING DECISION BY THE COLLABORATORS

(75) Inventors: Kevin T. Mabie, Reston, VA (US); Fred Spiker, Bristow, VA (US); Franklin T. McArthur, Falls Church, VA (US); Tate S. Srey, Centreville, VA (US); Dennis R. Bonilla, Fairfax, VA (US)

(73) Assignee: Valador, Inc., Herndon, VA (US)

( * ) Notice: Subject to any disclaimer, the term of this patent is extended or adjusted under 35 U.S.C. 154(b) by 523 days.

(21) Appl. No.: 12/572,264

(22) Filed: Oct. 1, 2009

Related U.S. Application Data

(60) Provisional application No. 61/101,990, filed on Oct. 1, 2008.

(51) Int. Cl.
*G06F 3/00* (2006.01)

(52) U.S. Cl.
USPC .......................................................... 715/751

(58) Field of Classification Search
CPC ... G06F 3/0484; G06F 3/0481; G06F 3/0482; G06F 3/04842
USPC ................................................. 715/751–759
See application file for complete search history.

(56) References Cited

U.S. PATENT DOCUMENTS

| 4,336,122 | A | 6/1982 | Spirig |
| 4,349,428 | A | 9/1982 | Lu et al. |
| 5,112,463 | A | 5/1992 | Zhang et al. |
| 5,482,792 | A | 1/1996 | Faita et al. |
| 2003/0220973 | A1* | 11/2003 | Zhu et al. ....................... 709/205 |
| 2004/0205091 | A1* | 10/2004 | Mulcahy et al. ............... 707/204 |
| 2005/0151963 | A1* | 7/2005 | Pulla et al. ............... 356/139.03 |
| 2006/0011491 | A1 | 1/2006 | Logan et al. |
| 2006/0087987 | A1* | 4/2006 | Witt et al. ...................... 370/260 |
| 2006/0206246 | A1* | 9/2006 | Walker ............................. 701/16 |
| 2008/0120064 | A1* | 5/2008 | Urmanov et al. ............. 702/182 |

(Continued)

FOREIGN PATENT DOCUMENTS

| CN | 1996777 A | 5/2007 |
| FR | 2 847 722 | 5/2004 |

(Continued)

*Primary Examiner* — Omar Abdul-Ali
*Assistant Examiner* — Haimei Jiang
(74) *Attorney, Agent, or Firm* — Whitham, Curtis, Christofferson & Cook, P.C.

(57) ABSTRACT

A method and system for documenting collaboration by a team analyzing telemetry data, where the data is used to generate a three dimensional visual display modeling the objects and events recorded by the telemetry data. One of the collaborating team members controls display of the model, and each collaborator is able to interact with the visual display and to employ a virtual camera to display and record operation of the model from a perspective selected by the member. Collaborating team members enter time-stamped notes which are displayed in sequential order for all collaborators on a common portion of a display screen upon replay of the simulation. Each team member is provided with a microphone and audio gear to collaborate by voice with other members of the team. The notes and virtual camera views coupled to the simulation provide decision makers on the team with an improved understanding of the problem modeled by the simulation, thereby facilitating an improved decision.

27 Claims, 9 Drawing Sheets

(56) References Cited

U.S. PATENT DOCUMENTS

2009/0171612 A1\* 7/2009 Dhanekula et al. ........... 702/122
2010/0096491 A1\* 4/2010 Whitelaw et al. ............... 244/15

FOREIGN PATENT DOCUMENTS

| GB | 1 136 869 | 12/1968 |
| WO | WO 01/98560 | 12/2001 |

\* cited by examiner

SYSTEM AND METHOD FOR COLLABORATIVE VIEWING OF A FOUR DIMENSIONAL MODEL REQUIRING DECISION BY THE COLLABORATORS

RELATED APPLICATION

This application claims priority from U.S. Provisional Patent Application No. 61/101,990 of the same title filed on Oct. 1, 2008.

COMPUTER PROGRAM LISTING APPENDIX

The invention described in this application is implemented in software, the modules of which are referred to in the specification and drawings and which are set forth in ASCII text in a Computer Program Listing Appendix containing 146 files of source code, the contents of which are incorporated herein by reference, each module being listed by module name in a file associated with this application.

BACKGROUND OF THE INVENTION

1. Field of the Invention

The present invention generally relates to dynamic displays of problem simulations and more particularly to such displays adapted to collaboration on the problem by a team of viewers.

2. Background Description

Simulation technology has long been used for dynamic visual display of three dimensional activities driven by models. More recently, this technology has been used to develop games that provide interactive three dimensional visualization of imaginary scenes rendered on the basis of mathematical models.

However, much scientific and technical data about real-world situations is gathered in a form that is not easily rendered. For example, telemetry data recovered from monitoring instruments designed to record events at a remote location—in space, for example—is in the form of a binary data stream. Furthermore, analysis of this data is typically undertaken by teams of individuals having a variety of special skills for interpreting the events that have been monitored.

Consequently, there is a need for a system and method enabling teams of individuals to collaborate in the interpretation of dynamic events recorded by remote telemetry data via an interactive visual simulation modeled from that data.

SUMMARY OF THE INVENTION

It is therefore an object of the present invention to provide a collaborative environment for a team of decision makers to review a simulation representing a real-life situation requiring a decision.

The invention operates by adapting conventional three dimensional game playing software to enable those involved in a collaborative review of the situation represented by the simulation to make a record of their collaboration, a record which may be reviewed and extended by the tools provided by the invention.

One aspect of the invention is a method for documenting collaboration by a team analyzing telemetry data from an instrument monitoring events at a remote location. The telemetry data is used to generate a three dimensional visual display that provides a dynamic representation of the monitored events over the time period covered by the telemetry data. This dynamic representation over time is called a "simulation" of the monitored events. One member of the collaborating team controls play of the simulation during a collaborative session, and each of the team members is able to interact with the simulation. Team members may be in different locations and are provided with access to the same display.

Each collaborator is provided with assets and controls enabling the simulation to be viewed from a variety of perspectives within the three spatial dimensions occupied by the simulation. The collaborator selects a perspective by using controls to move within the simulated space and change the direction of view. If the view shows something of interest, the collaborator may document the view by turning on a virtual camera that records events displayed by the simulation from the selected perspective. The collaborating team member may also enter notes which further document observations of the collaborator. The notes are time-stamped with respect to the running time of the simulation.

The viewing screen available to each member of the collaborating team shows the simulation perspective selected by the collaborator. The viewing screen also shows menu options available to the collaborator and a banner containing simulation status and other information helpful to the collaboration. The menu and information banner are typically displayed on the margins of the viewing screen, so as to be readily available without obscuring the simulation.

Upon playback of the simulation the time-stamped notes are displayed, in sequential order based on the time-stamp, in a window adjacent to the information banner. Each team member is provided with a microphone and audio gear to collaborate by voice with the other members of the team. In the best mode of implementation, Voice Over Internet Protocol (VOIP) is used to enable audio collaboration. The documentation coupled to the simulation provides decision makers on the team with an improved understanding of the problem modeled by the simulation, thereby facilitating an improved decision.

In a preferred embodiment of the invention, a method is provided for documenting collaboration to resolve a problem disclosed by telemetry data in the operation of a complex that is remote from at least some of the collaborators. The complex may comprise, for example, equipment deployed in orbit around the Earth or elsewhere at a remote location beyond the Earth, and may include objects in addition to the equipment deployed. The situation at the remote location is monitored by one or more instruments, and these instruments provide telemetry data recording events involving the equipment and other objects at the remote location. In the preferred embodiment the telemetry data is transmitted from the remote location via electromagnetic signals, but the invention is also operable if the data recorded by the monitoring instruments is transmitted by other means, such as via delivery of the recording instrument itself or the media upon which the data is recorded, to a location having equipment capable of reading the data and generating from the monitoring data a visual representation simulating the events taking place over time at the remote location.

The visual representation or simulation, which is constructed with the aid of the telemetry data, typically shows the best information that can be made available regarding some problem or performance issue being experienced at the remote location. A variety of experts, each having an interest and expertise of relevance to operation of the remote complex, may be required to adequately address the problem or performance issue being experienced at the remote complex.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
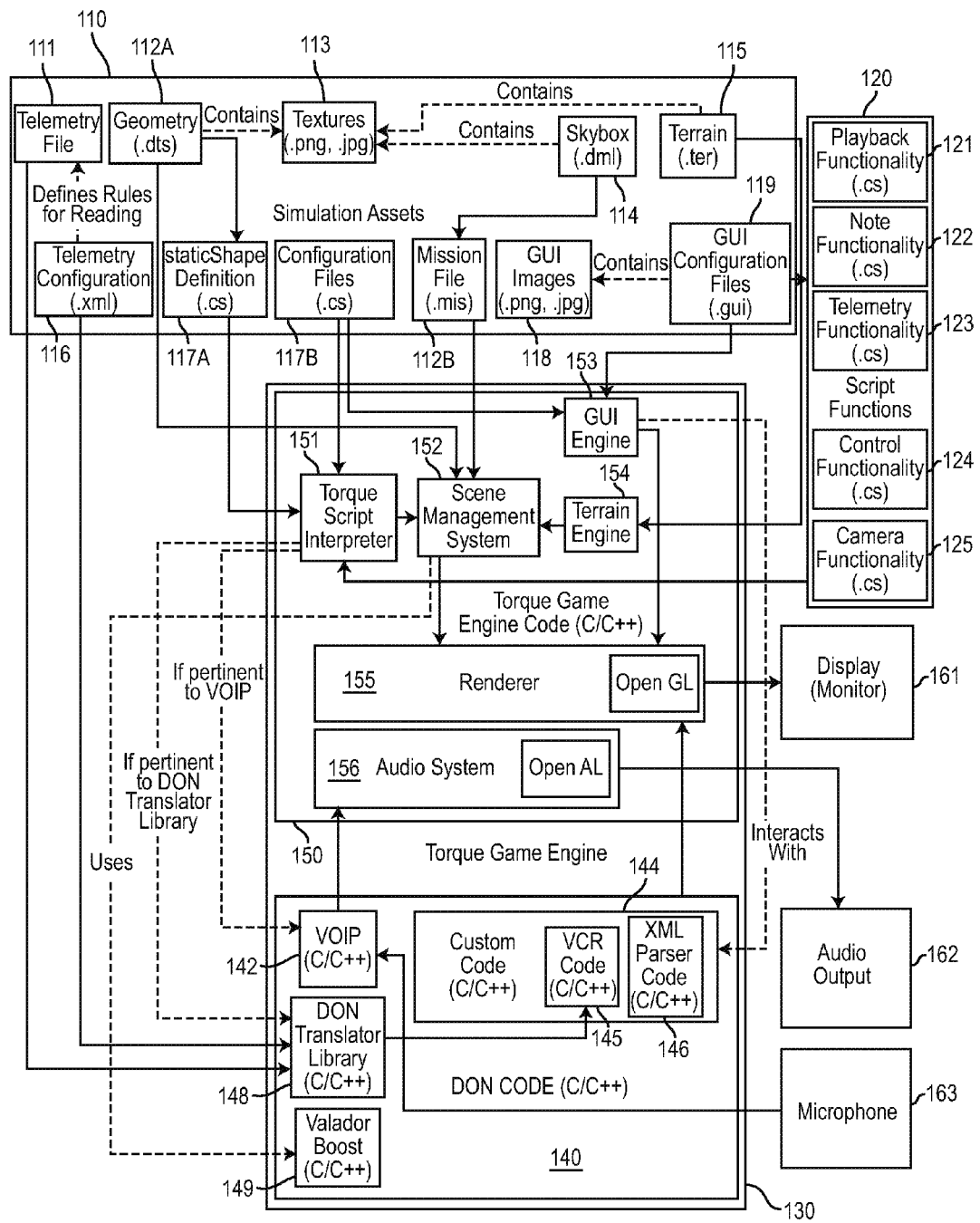
FIG. 1A is a schematic diagram showing a design overview of the Distributed Observer Network (DON).

The Distributed Observer Network (DON) is an immersive collaborative engineering environment built on gaming technology. FIG. 1B is a schematic rendering of a preferred implementation of the main menu and information banner portions of a Graphical User Interface (GUI) 180 for use by team members collaborating using the DON. The main menu is activated and deactivated by a toggle key (e.g. the space key). The majority of the DON GUI 180 is occupied by a graphic image space 190 for a visualization display (not shown in FIG. 1B) of the simulation generated from the telemetry data. When the main menu is being displayed, the user is not able to move around the 3D environment displayed in graphic image space 190. When the main menu is deactivated the user can move viewing location and change perspective in the 3D environment using a set of four directional keys (e.g. the WASD keys) and the mouse.

Upon initialization of the DON, a team member uses the preferences submenu 194 to set their user name, the Avatar, custom Avatar attributes, master server location, system preferences, keyboard configuration, and the volume of VOIP transmission. To start a particular simulation a collaborating team member uses the simulation submenu 191, which opens a screen listing available simulations for selection.

Each of the simulations is modularized into a simple folder structure that comprises all the assets required to run the simulation, including telemetry, lights, graphical assets, models, and the necessary configuration files. The user is able to start a new simulation in stand-alone mode or join the simulation server. If a user joins a server that is running a simulation that is not on the user's local machine, the DON client will automatically download the necessary assets from the server.

The DON has a control scheme in which only one user can have controller status. The controller uses the control submenu 193 to select one or more telemetry feeds for generating a graphic image of a remote complex, showing events as they unfold during the time period covered by the telemetry data. The control submenu 193 also contains a playback control allowing the controller to play the simulation backward or forwards, change the rate at which it is being played, skip to the beginning or the end, loop the simulation, or scrub forward and backward through the simulation. The DON also has the capability to receive and process streaming data sent real time. The control submenu 193 also enables another team member to request controller status.

The information banner of GUI 180 is shown schematically at the top of FIG. 1B as items 181-188 in a preferred implementation. The items shown may be supplemented from time to time as described below to reflect certain conditions that may arise during the simulation. The information banner contains the current time of the simulation 181, the name of the simulation 182 and the name of the controller 183. The simulation time 181 is preferably measured in relation to the length of time spanned by the telemetry data from which the simulation is constructed. In addition, a portion of the display is made available for time enabled notes 184, including system messages (such as user connects and disconnects, notes and telemetry loads) and chat messages. The information banner also has a set of toggle buttons: the buttons are toggle buttons used to toggle on and off the graphic data window (toggle 185), the text data window (toggle 186), system messages (toggle 187), and chat messages (toggle 188).

Having been built on top of a game engine, the DON has a full suite of collaboration tools found in modern first person shooter 3D games and massive multiplayer on-line role playing games. This includes text chatting which allows users to communicate to others with text. The DON also features voice over IP, commonly referred to as 'VOIP', which allows users to collaborate by voice communication. When VOIP is activated a speaker icon appears on the information banner of the one who is speaking. This indicates that the voice of the speaker will be transmitted to all other collaborators participating in the simulation.

Since the DON environment is a fully immersive 3D environment, the user can view the simulation from any spatial location and from any angle or perspective based on that location. In a preferred embodiment the user navigates to a desired spatial location and takes a desired viewing perspective using a set of four directional keys (e.g. the WASD keys on the keyboard) and the mouse. The user may want to save a view to go back to later or to share with other users. This can be done through a camera window (not shown) available under the collaboration submenu 192. The camera window allows for the creation and deletion of "virtual cameras". A newly created camera will appear at the user's current position, and a mini-display of this camera view may also be displayed as a snapshot in a window within the camera window at the time the new camera view is created. This snapshot may also be displayed when this camera view is selected in a list of camera points displayed in another window within the camera window. The camera window also allows for modification of a camera's name and determination whether the virtual camera is a fixed view camera or not.

Each collaborator may create and name one or more of these cameras, and a list of the names of all the cameras (also called "camera points") is displayed in a portion of the camera window. A camera view selected from the list is displayed in graphic image space 190. The user can cycle the display through the camera views on the list by a single click or key (e.g. the right mouse button). The order in which a camera is cycled through graphic image space 190 is based on the order in the camera list window. The position of any selected camera view on the list can be moved up or down, thereby modifying the cycling order. Preferably, the user can change the view (and reset a beginning point for the cycling order) by selecting a camera from the camera list and pressing a "switch view" button provided within the camera window.

When a camera has been created and named, all other users in the same simulation will be able to jump to the newly created camera view by selecting the camera submenu under the collaboration submenu 192, and then selecting the new name on the list of camera points. When a user jumps to a camera point, the name of the camera will appear on the information banner. If the camera is a fixed view camera, the user will not be able to change viewing perspective and the 'fixed view' icon will also appear in the information banner. If the camera is tethered to an object the 'tethered' icon will appear in the information banner as well.

Users can tether themselves to objects drawn by telemetry. This is done by selecting an object. The object will be highlighted in red. All users of the system will see the same object highlighted in red. This will allow all system users to reference the same object. Once the object is selected the user can press the 'tether' button under the collaboration submenu. The user's camera will now move relative to the selected object. To untether simply press the 'tether' button again. A user may create a tethered camera view by creating a new camera while the user is tethered.

Users can also create notes for other users to see. This is done through the 'Notes' window under the collaboration submenu 192. Notes will have a title, content, a time stamp, and a camera. Once a note is created it can be modified, but the position and orientation of the user at the moment of creation is the camera view that is associated with the note. If 'enable time stamp' is checked within the 'Notes' window, the time of the note's creation is the time stamp that is associated with the note. When the 'Sim Time' 181 reaches the note's time stamp, the title of the note appears in the information banner.

A full roster of users who are connected to the system may be obtained by selecting 'user list' under the collaboration submenu 192. From the user list submenu window, the telemetry controller can also give control to another user. The DON also has the capability to display text overlays and image overlays. This is done through a series of slash commands embedded in a telemetry file.

Figure 1B:
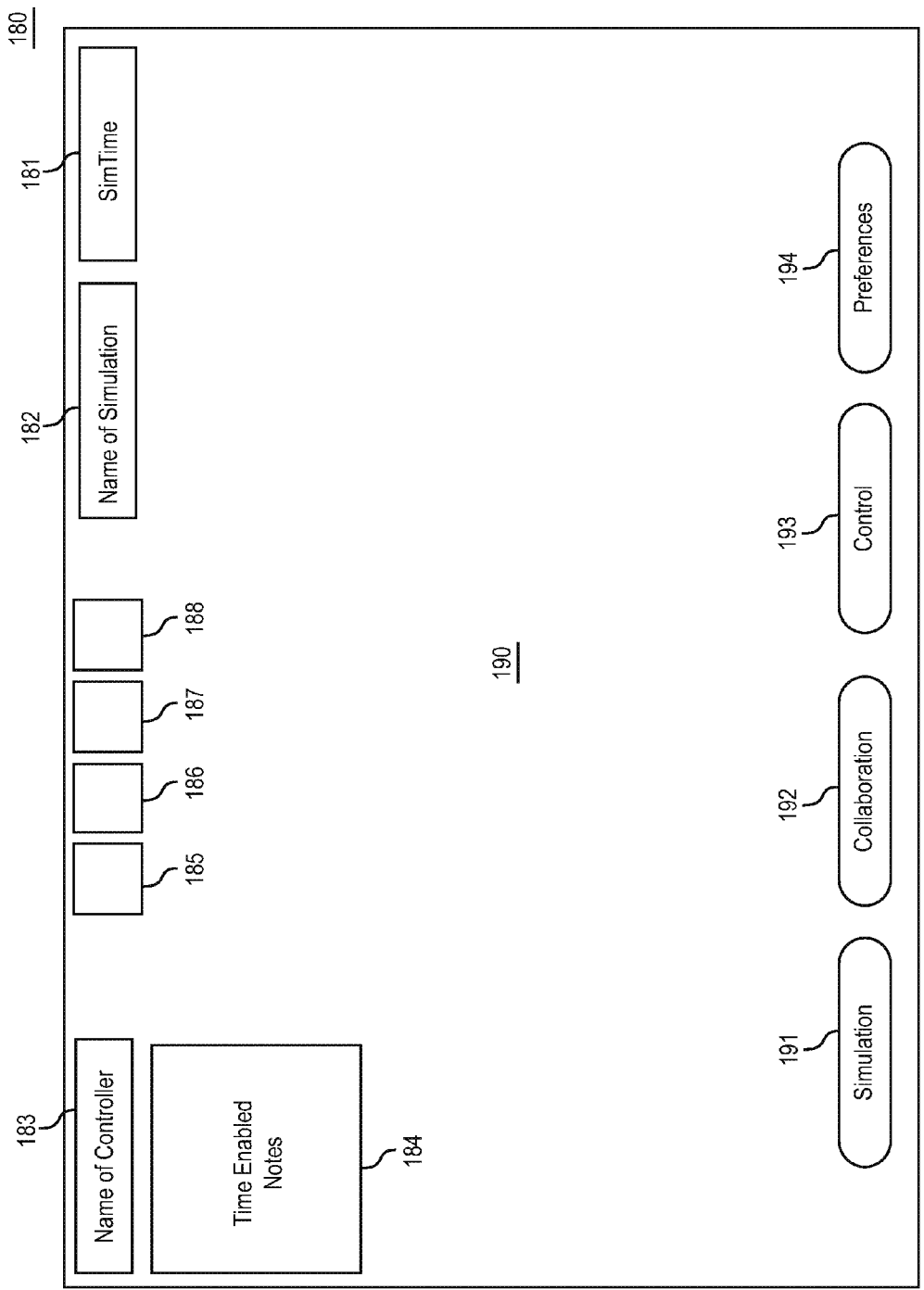
FIG. 1B is a schematic diagram showing an exemplar layout of main menu options and an information banner implementing a graphical user interface (GUI) for the DON.

FIG. 1A shows an overview of the Distributed Observer Network (DON) software solution design, as implemented in a preferred embodiment of the invention. The overview shows simulation assets 110, script function 120, including note functionality 122, and a modified game engine environment 130 within which the DON code 140 operates on the game engine platform 150. The overview also shows the basic I/O devices used in the implementation, a display 161, audio output 162 and microphone 163. While a particular game engine is used in this embodiment (the Torque game engine), the invention may be practiced with other game engines. Further, the I/O devices shown are duplicated for each collaborator connected to the system over the network, and note functionality 122 is available to each collaborator.

The basic interactions between components are indicated by directional lines, for example, simulation assets 110 includes telemetry data 111 which is translated into a form usable by the game engine environment 130 with the aid of the DON's translator library 148, which feeds custom code module 144. Similarly, geometry 112A and mission 112B file data from the simulation assets 110 is provided to the game's scene management system 152, which is enhanced by the Valador boost code 149. DON code 140 also includes a module 142 for adapting a Voice Over Internet Protocol (VOIP) to the multiparty collaboration supported by the invention.

Further, geometry 112A, skybox 114 and terrain 115 modules each contain textures 113. Geometry 112A is provided to static shape definition module 117A, which in turn provides static shapes to the game engine script interpreter (Torque-Script Interpreter) 151. Terrain module 115 provides terrain assets to terrain engine 154, which in turn provides services to scene management system 152. Configuration files 117B are provided both to the script interpreter 151 and Graphical User Interface (GUI) engine 153, which in turn supports renderer 155 and interacts with DON custom code module 144. GUI configuration files 119, containing GUI images 118, drive GUI engine 153 and are provided to script functions 120, which include playback functionality 121, telemetry access 123, control functionality 124 and camera functionality 125, in addition to note functionality 122.

Within game engine platform 150, script interpreter 151 provides services to scene management system 152 and, if pertinent, to DON translator library 148 and VOIP module 142. Renderer 155, with support from the scene management system 152, GUI engine 153 and DON custom code module 144, drives display 161. Audio system 156, with input from VOIP module 142, drives audio output 162. Microphone 163 provides input to VOIP module 142. Custom code 144 includes VCR code 145 and XML parser code 146.

Figure 2A:
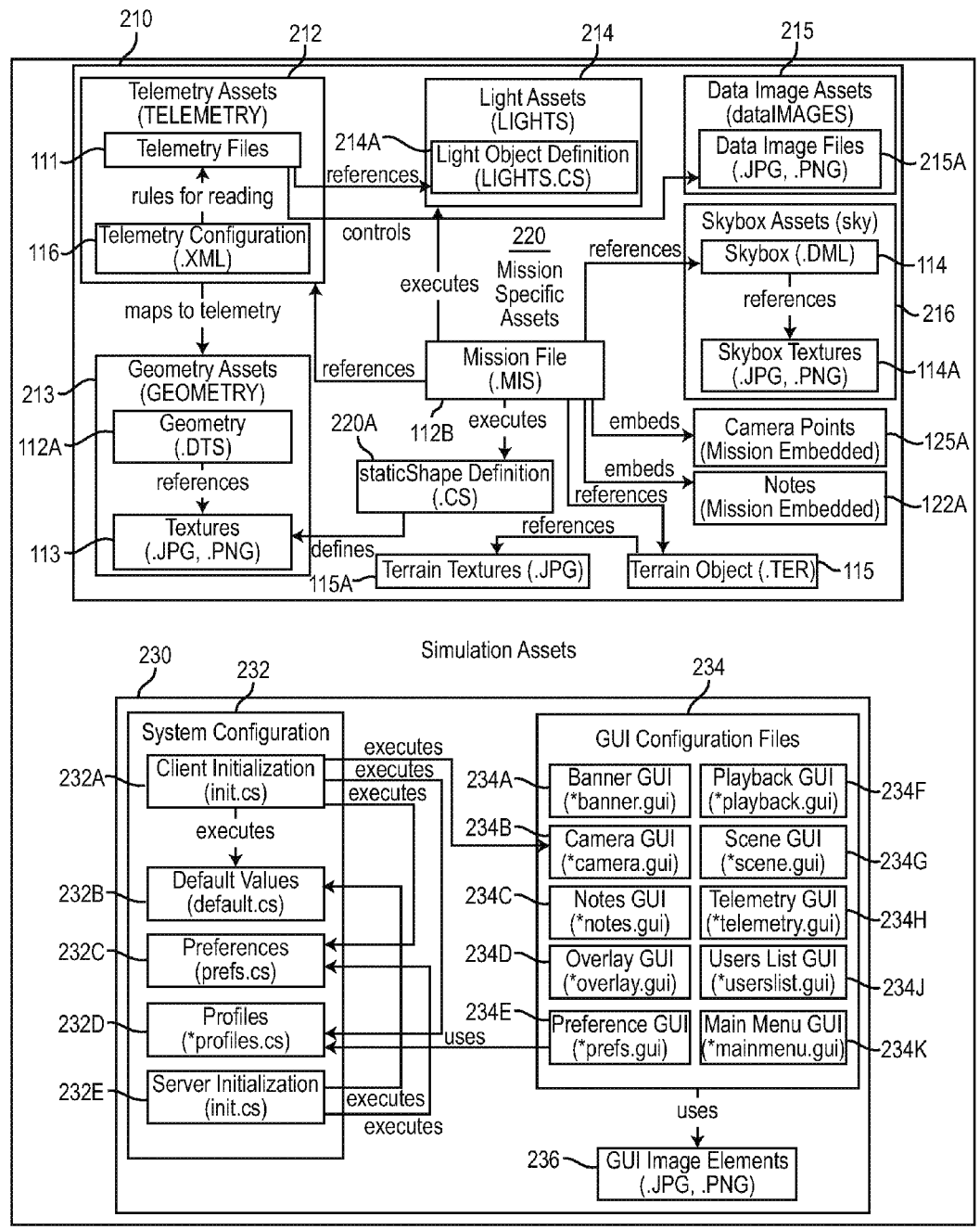
FIG. 2A is a more detailed schematic diagram of the simulation assets shown in FIG. 1A.

Simulation assets 110 are further described in FIG. 2A. These assets include a block of mission specific assets 210. The mission specific assets 210 comprise several groups of assets: telemetry assets 212 (the telemetry files 111 and the configuration rules 116 for reading them), geometry assets 213 (geometry module 112A which references textures 113), light assets 214 (comprising light object definition 214A), data image assets 215 (comprising data image files 215A), skybox assets 216 (comprising skybox module 114 which references skybox textures 114A), as well as mission specific assets 220. The remaining components 220 of mission specific assets 210 revolve around mission file 112B, which executes static shape definitions 220A and light assets 214, references telemetry assets 212, skybox assets 216, terrain object 115 and, in turn, terrain textures 115A. Camera points 125A and notes 122A are embedded in the mission via mission file 112B. Static shape definitions 220A define geometry assets 213. Telemetry files 111 references light assets 214 and controls data image assets 215. Telemetry configuration 116 draws upon geometry assets 213 to map to telemetry assets 212.

The simulation assets 110 also include a block 230 of DON system assets comprising system configuration data 232 and GUI configuration files 234, which use GUI image elements 236. System configuration 232 is further composed of client initialization 232A (init.cs), default values 232B (default.cs), preferences 232C (prefs.cs), profiles 232D (profiles.cs), and server initialization 232E (also in init.cs). Client initialization 232A executes GUI configuration files 234, default values 232B, preferences 232C and profiles 232D. Server initialization 232E executes default values 232B and preferences 232C. Profiles 232D are used by the GUI configuration files 234, which further comprise banner GUI 234A (*banner.gui), camera GUI 234B (*camera.gui), notes GUI 234C (*notes-.gui), overlay GUI 234D (*overlay.gui), preferences GUI 234E (*pref.gui), playback GUI 234F (*playback.gui), scene GUI 234G (*scene.gui), telemetry GUI 234H (*telemetry.gui), users list GUI 234J (*userslist.gui) and main menu GUI 234K (*mainmenu.gui).

Figure 2B:
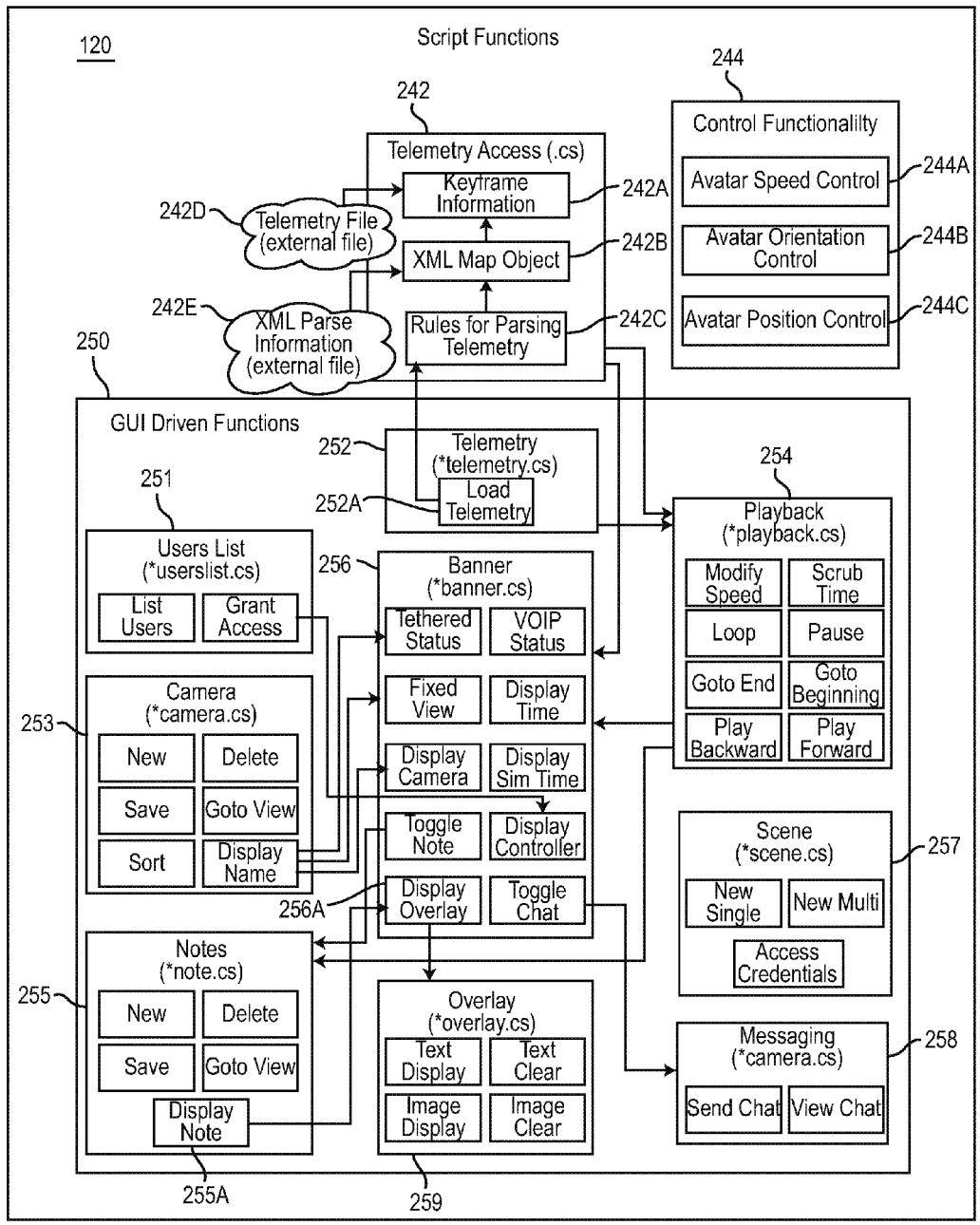
FIG. 2B is a more detailed schematic diagram of the script functions shown in FIG. 1A.

Script functions 120 are further described in FIG. 2B. Scripts provide for telemetry access 242 and control functionality 244, further comprising avatar speed control 244A, avatar orientation control 244B, and avatar position control 244C, for the avatars moving within the simulated environment. The telemetry access script 242 handles keyframe information 242A, which is driven by external telemetry file 242D and XML Map Object 242B, which is in turn driven by an external XML Parse Information file 242E and Rules for Parsing Telemetry 242C.

The scripts also include a block 250 of GUI driven functions, including a users list 251 (script 'userslist.cs' containing functionality for 'list users' and 'grant access'), telemetry 252 (script '*telemetry.cs' containing functionality for 'load telemetry' 252A), camera 253 (script '*camera.cs' containing functionality for 'new' view, 'save' view, 'delete' view, 'goto view', and 'display name' of view), playback 254 (script '*playback.cs' containing functionality for 'modify speed', 'loop' telemetry, 'goto end', 'goto beginning', 'scrub time', 'pause', 'play forward', and 'play backward'), notes 255 (script '*note.cs' containing functionality for 'new' note, 'save' note, 'delete' note, 'display note' 255A, and 'goto view'), banner display 256 (script '*banner.cs' containing functionality for 'tethered status', 'VOIP status', 'display time', 'display simulation time', 'display camera', 'display controller', 'display overlay' 256A, 'fixed view', 'toggle note', and 'toggle chat') scene 257 (script '*scene.cs' containing functionality for 'new single' scene, 'new multiple' scenes, and 'access credentials'), messaging 258 (within the 'camera.cs' script and containing functionality for 'sent chat' and 'view chat') and an overlay 259 (script '*overlay.cs' containing functionality for 'text display', 'text clear', 'image display' and 'image clear') for the control of text and image.

Telemetry 252 has load telemetry function 252A which supports rules for parsing telemetry 242C. Telemetry access 242 provides input for playback 254 and banner 256. Telemetry 252 provides input of the results of telemetry data (which, as described above, has been used to generate a corresponding simulation) to playback 254. Playback 254 provides input to banner 256 and notes 255, so that the banner and notes features are coordinated on the display 180. Display note function 255A within notes 255 is a driver for display overlay function 256, which in turn provides input to overlay 259. As described above, the overlay is controlled by commands embedded in telemetry data.

'Display name' function within camera 253 provides input to the functions 'display camera', 'fixed view' and 'tethered status' which have corresponding icons displayed on the information banner (described above in connection with FIG. 1B). 'Grant access' function within users list 251 provides input to the 'display controller' function within banner 256, resulting in display of the current controller on the information banner. The 'toggle chat' function within banner 256 is a driver for send chat and view chat functions within messaging 258. The 'toggle note' function within banner 256 is a driver for toggling display of notes within the window 184 for time enabled notes.

Figure 2C:
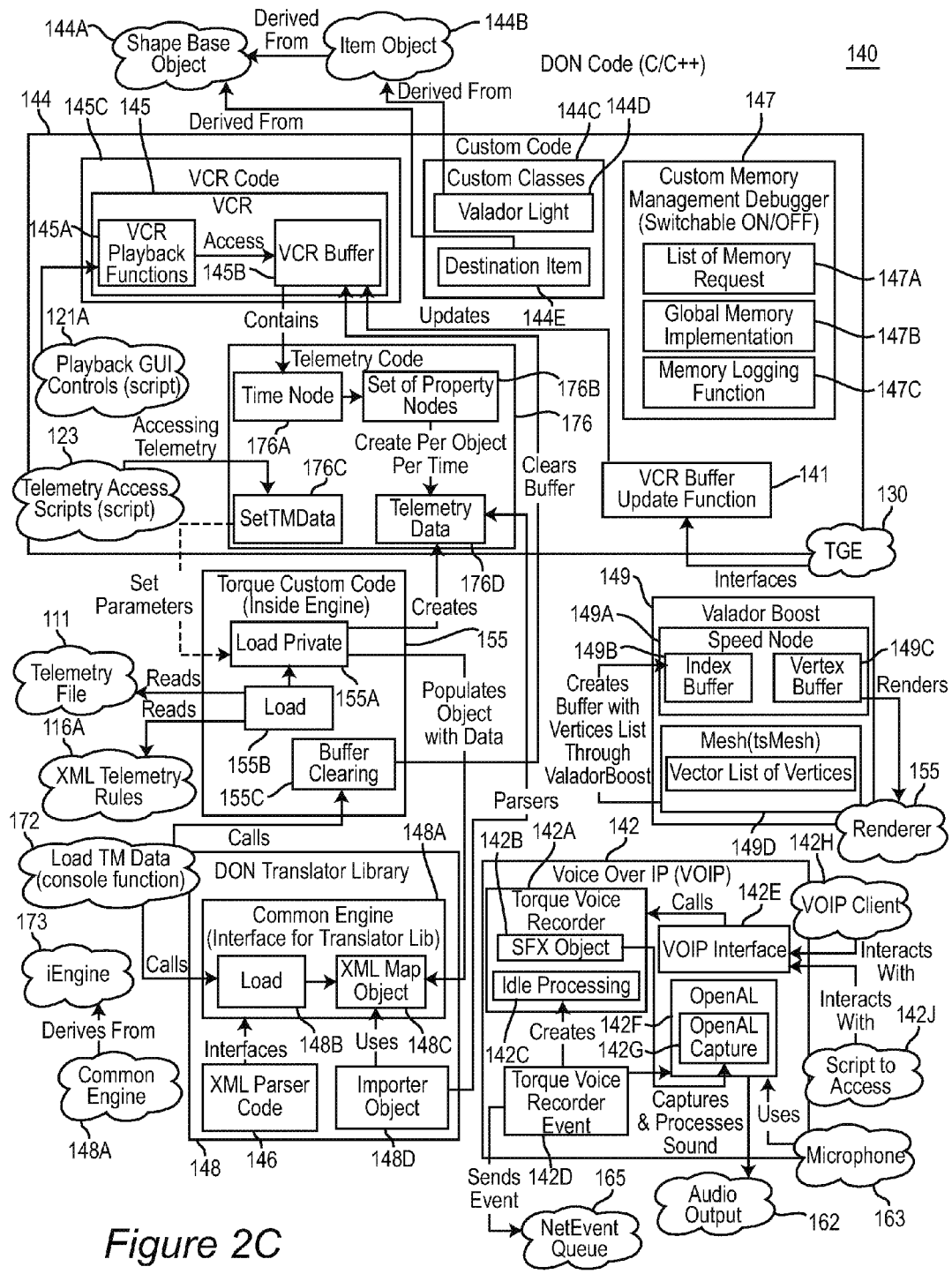
FIG. 2C is a more detailed schematic diagram of the DON code shown in FIG. 1A.

DON code 140 is further detailed in FIG. 2C. Custom code 144 contains VCR code 145, telemetry code 176, as well as custom classes 144C and a customer memory management debugger 147. The DON code 140 also includes a Torque custom code module 155 inside the game engine 150, as well as the VOIP module 142, the DON translator library 148 and Valador Boost 149. The script for playback GUI 121A controls VCR playback functions 145A, which access VCR buffer 145B, which in turn contains time node 176A. The modified game engine environment (e.g. the Torque Game Engine 130) interfaces with VCR buffer update function 141 which updates VCR 145C containing VCR buffer 145B. There is a "derived from" relationship between 'Valador light' 144D (in custom classes 144C) and 'item object' 144B, which has a "derived from" relationship with 'shapebase object' 144A, as does 'destination item' class 144E. Within telemetry code 176 time node 176A links to 'set of property nodes' 176B. Telemetry data 176D creates a 'set of property nodes' 176B for each object and at each time. As telemetry is parsed, values get set on 'shapebase object' 144A, which game engine 130 uses to move the object (which is described by the parsed data values) around.

Scripts for telemetry access 123 provide input to 'SetTMData' 176C, which then sets parameters for the 'load private' function 155A within Torque Custom Code 155. Custom memory management debugger 147, which can be switched on and off, maintains a 'list of memory request' 147A, a 'global memory implementation' 147B and a 'memory logging function' 147C. The load function 155B within Torque Custom Code 155 reads telemetry file 111 and XML telemetry rules 116A, and drives 'load private' 155A which in turn creates telemetry data 176D and also populates XML map object 148C with data. Buffer clearing function 155C within Torque Custom Code 155 clears VCR buffer 145B.

The DON translator library 148 contains common engine 148A, which is the interface for the translator library. The common engine 148A contains a load function 148B which drives XML map object 148C. The load function 148B is called by the console function 'load TM data' 172, which also calls buffer clearing function 155C. XML map object 148C is used by importer object 148D, which parses telemetry data 176D. The common engine 148A interfaces with XML parser code 146. It should be noted that common engine 148A derives from 'iEngine' 173, which in this implementation of the invention is the C++ class that implements traversal of the telemetry keyframe structure. The telemetry keyframe structure is described in connection with FIGS. 3A and 3B, below.

Valador boost 149 contains speed node 149A, which is comprised of index buffer 149B and vertex buffer 149C. Mesh function 149D contains a 'vector list of vertices' and uses the vertices list to create the buffers in speed node 149A. The Valador boost speed node 149A renders for renderer 155.

VOIP 142 contains Torque voice recorder 142A, Torque voice recorder event 142D, VOIP interface 142E and 'OpenAL' 142F. VOIP client 142H and 'script to access' 142J both interact with VOIP interface 142E. Torque voice recorder 142A contains SFX object 142B and idle processing 142C. SFX object 142B captures and processes sound for the OpenAl capture function 142G within 'OpenAL' 142F. Microphone 163 uses OpenAL capture function 142G, and 'OpenAL' 142F provides audio output 162. Idle processing 142C creates Torque voice recorder event 142D. NetEvent queue 165 sends events to Torque voice recorder event 142D.

Figure 3A:
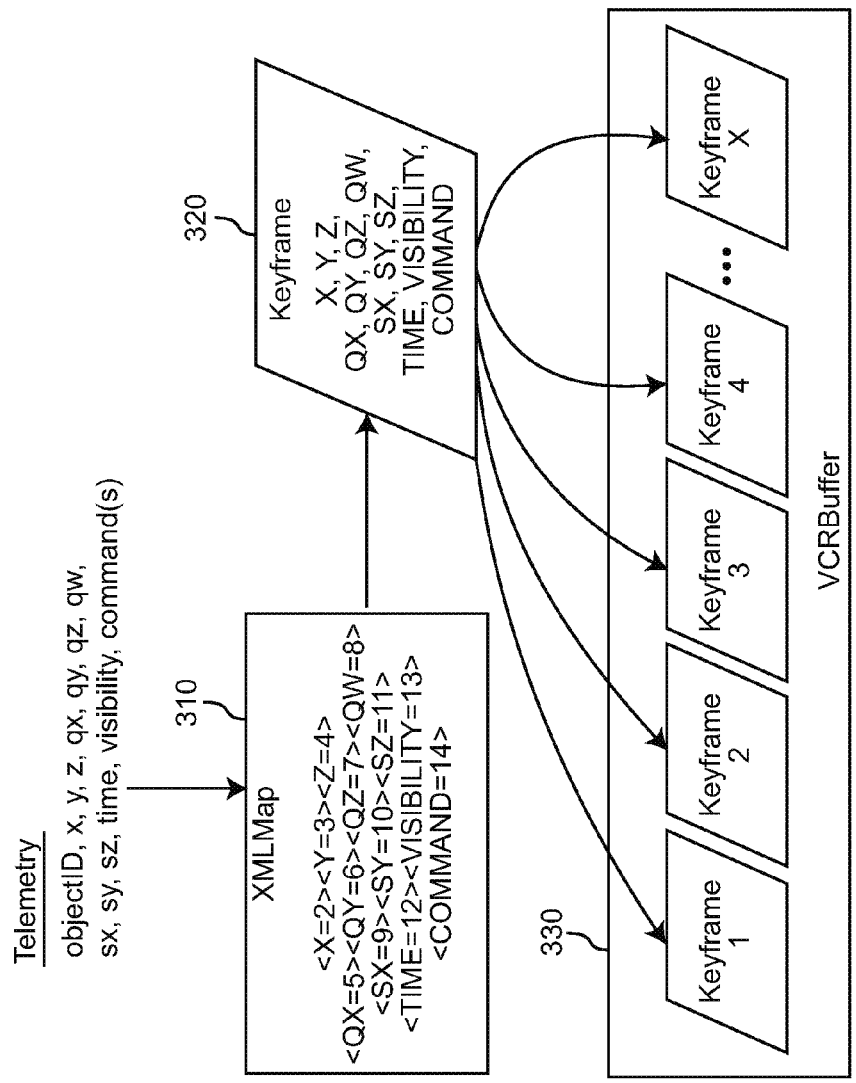
FIG. 3A is a schematic overview showing how telemetry data is parsed.

An overview of the parsing of telemetry data is shown in FIG. 3A. The telemetry data used in the preferred implementation of the invention is a stream of data containing successive "trees" of data, each tree comprising: an object ID, position elements (x,y,z), rotation elements (qx,qy,qz,qw), scale elements (sx,sy,sz), time, visibility, and command(s). This data is mapped 310 with XML tags, and then parsed 320 into keyframes which are stored in the VCR buffer 330.

Figure 3B:
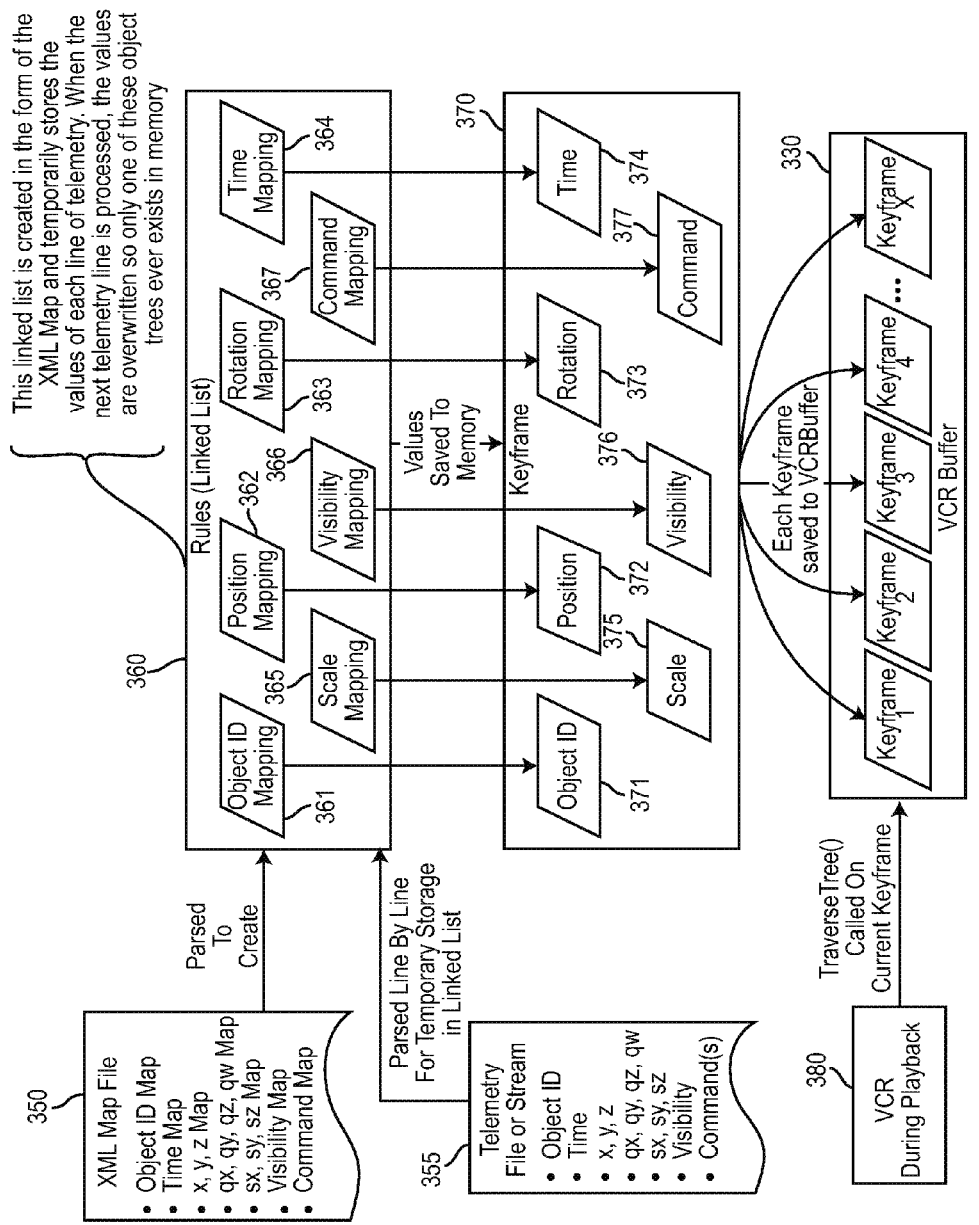
FIG. 3B is a schematic diagram showing how keyframe data is generated from parsed telemetry data and an XML map.

This process is shown in greater detail in FIG. 3B. The telemetry file (a stream of data) 355 is parsed line by line in accordance with an XML map file 350 for temporary storage in a linked list 360 in the form of an XML map. Linked list 360 is comprised of object ID mapping 361, position (x,y,z) mapping 362, rotation (qx,qy,qz,qw) mapping 363, time mapping 364, scale (sx,sy,sz) mapping 365, visibility mapping 366, and command mapping 367. The values in each line of the telemetry stream are then saved to memory 370 as a keyframe comprised of object ID 371, position 372, rotation 373, time 374, scale 375, visibility 376, and command 377. When the next telemetry line from telemetry file 355 is processed, the values in linked list 360 are overwritten so only one of these object trees ever exists in temporary memory. Each keyframe 370 is saved in sequence to the VCR buffer 330. During playback the VCR buffer 330 is filled from the VCR 380.

Figure 4:
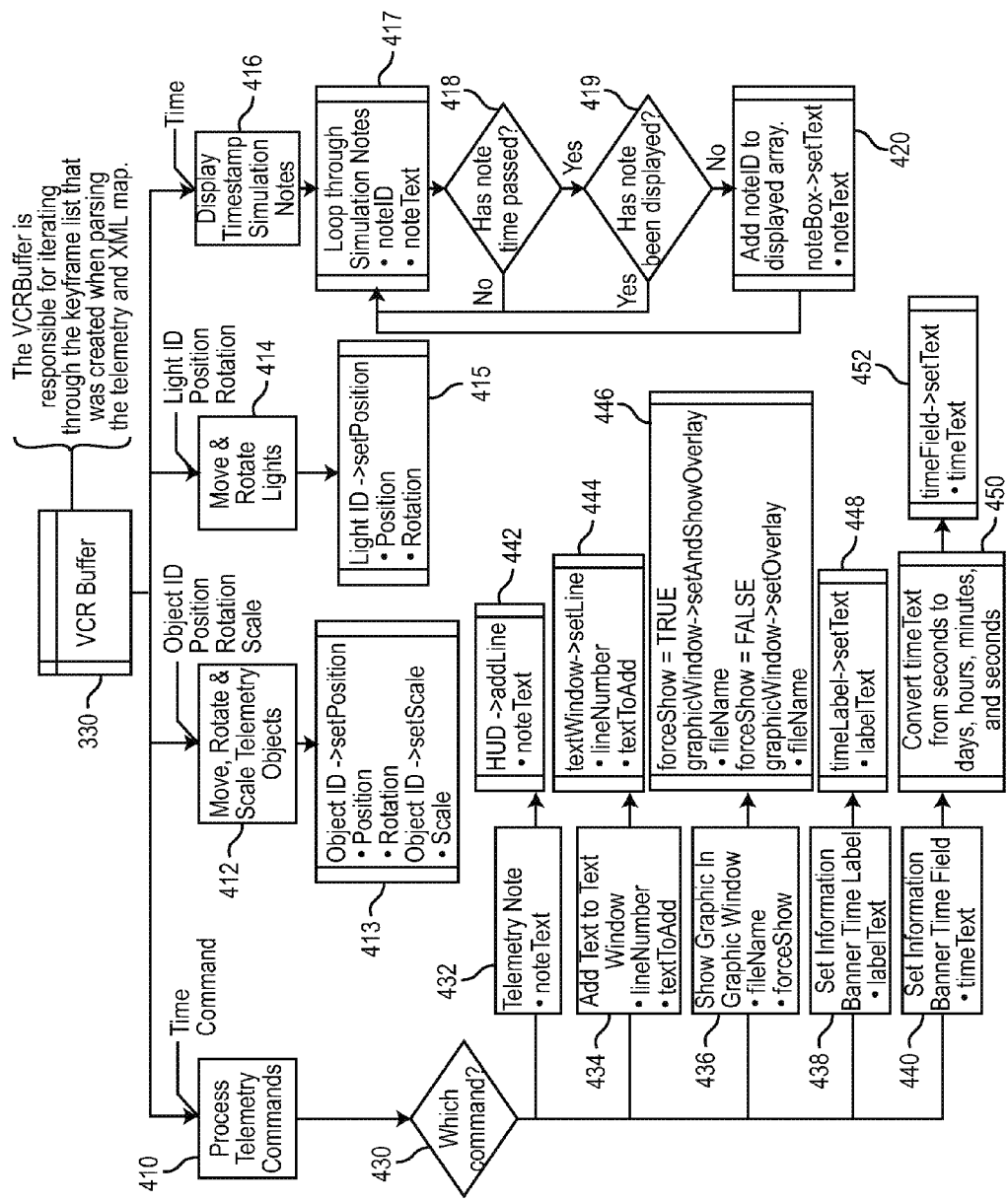
FIG. 4 is a flowchart showing operation of the VCR buffer.

Operation of the VCR buffer 330 is detailed in FIG. 4. The VCR buffer 330 is responsible for iterating through the keyframe list that was created when parsing the telemetry data 355 and XML map 350. Telemetry commands are processed 410, telemetry objects are moved, rotated and scaled 412, lights are moved and rotated 414 and timestamp simulation notes are displayed 416. The handling of telemetry objects 412 associates an object ID with a data record 413 indicating position, rotation and scale. Similarly, in item 414, a light ID is associated with a data record 415 indicating position and rotation. The display of simulation notes 416 is handled by looping through the notes 417, examining the timestamp on each note, keeping a note in the loop until the time on the timestamp has passed 418, at which point the note is retained in the loop if it has been displayed 419 and the note ID is added 420 to the displayed array if it has not been displayed.

The processing of telemetry commands 410 first determines which command 430 is being processed. If the command is a telemetry note 432, the note text is added as a line 442 in the heads-up-display (HUD). It should be noted that the text data comprising a telemetry note may be displayed in a variety of ways. A heads-up-display is advantageous because it does not require the user to look at a different place on the screen from where their attention is focused (e.g. the particular object which is described by the telemetry data within which the note text is embedded). However, other locations for the display of note text are feasible, and can be learned by the user with similar effect as the HUD. Wherever displayed, the note text displayed in text window 434 may be toggled on and off by the text data window toggle 186.

If the command in the telemetry stream is to add text to a text window 434 an appropriate line number and text to add is set 444. Also included here is a command to clear to update certain lines of text in the text window 434 or clear the text window. In any event, when a new telemetry is loaded the next window 434 is cleared of all data from the old telemetry. A command regarding a graphic in a graphic window 436 will either set an overlay or set and show an overlay 446, according to the command 436. A command 438 may also set the information banner time label 448. Or the command 440 may set the time in the information banner, converting a text representation of total seconds to days, hours, minutes and seconds 450, which is then set in a data record 452.

Figure 5:
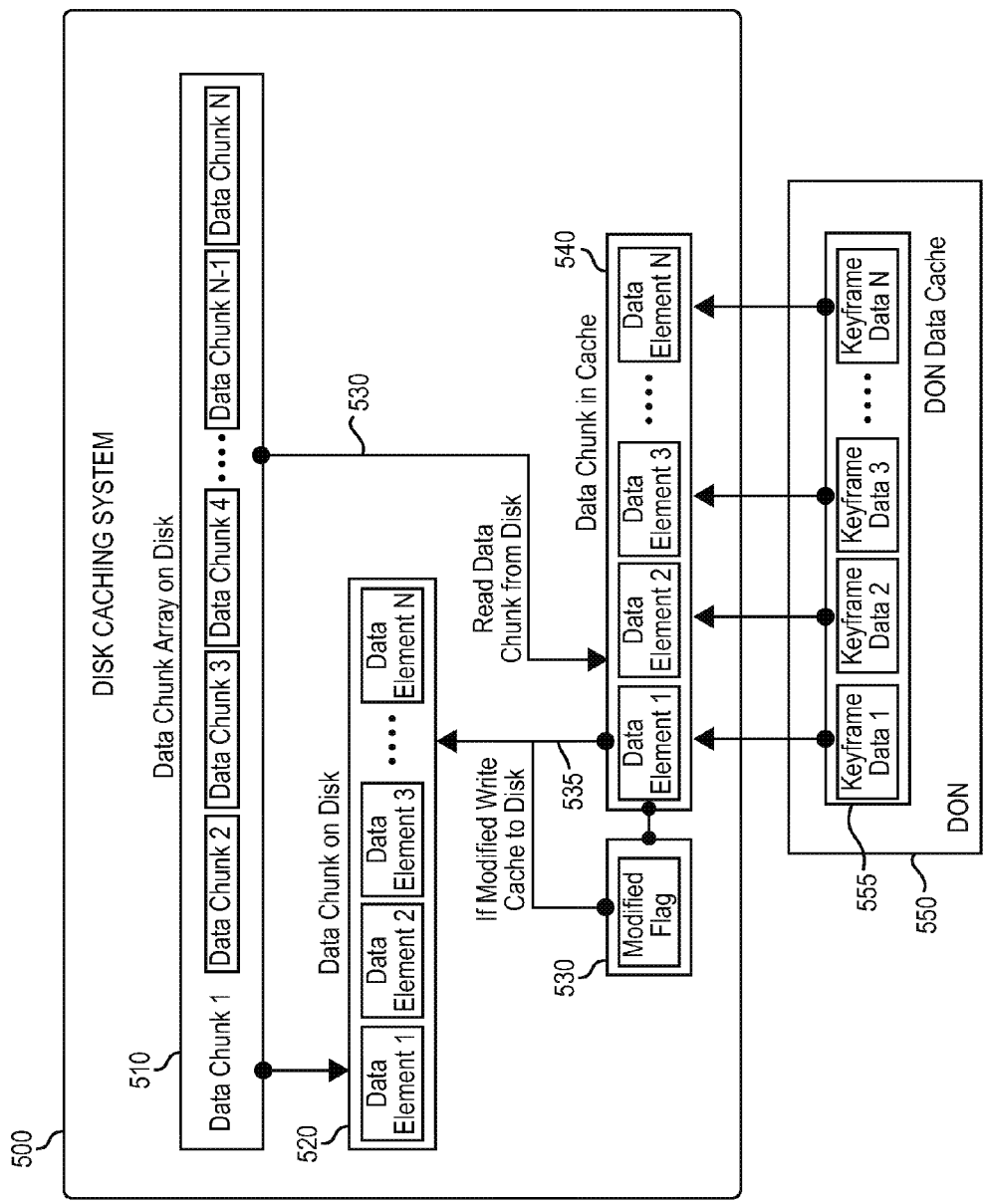
FIG. 5 is a schematic diagram showing how the DON data cache of keyframes is related to the disk caching system.

FIG. 5 shows how the caching of keyframe data 555 in the DON's data cache 550 is related to the data on disk in the disk caching system 500. Each chunk of data 520 arrayed 510 on the disk contains the data elements corresponding to the keyframe data in cache 550. A chunk of data is read from disk 530 and if modified 530 in relation to the corresponding cache data 555, the modified data from cache is written 535 to disk.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for documenting collaboration to resolve a problem disclosed by telemetry data in the operation of a three dimensional (3D) complex at a particular remote location, comprising:
    generating from the telemetry data a 3D representation of the complex over a period of time defined by the telemetry data, the complex being comprised of one or more objects proximate to one another within the complex and the telemetry data being provided by one or more monitoring instruments recording events at the particular remote location serving as a locus for the three dimensional complex, said representation being a dynamic 3D representation showing interactions between and among said one or more objects during said period of time;
    providing for each of a plurality of collaborators a 3D perspective chosen by each respective collaborator from which to view the 3D representation, each said chosen perspective being a directional orientation from a chosen location within the 3D representation, each collaborator having an expertise with respect to the problem being modeled in three spatial dimensions over time by the representation, each collaborator being able to change the chosen perspective and to move about within the 3D representation over said period of time;
    enabling each collaborator to document said chosen perspective at a selected point in time during viewing of the 3D representation, said documentation including entry by the respective collaborator of notes pertaining to said problem at said selected point in time; and
    displaying the entered notes in sequential order during a subsequent viewing of the 3D representation,
    wherein decision makers informed by the notes of collaborators resolve the problem being modeled by the 3D representation.

2. The method of claim 1, further comprising designating one of said plurality of collaborators to control a display over time of the 3D representation.

3. The method of claim 2, further comprising provisioning each collaborator with a microphone and audio link enabling voice collaboration among the collaborators.

4. The method of claim 1, wherein additional notes are entered by a collaborator during a subsequent viewing of the 3D representation.

5. The method of claim 1, wherein the sequential order of notes is determined by a time stamp added to each note and referenced to a point in time within a duration of said telemetry data.

6. The method of claim 1, wherein the perspective from which a collaborator views the 3D representation is provided by a virtual camera.

7. The method of claim 1, wherein at least one collaborator is located remotely from another collaborator.

8. The method of claim 2, wherein control of said display over time includes one or more of: stopping the display, restarting the display, restarting the display at a designated point in time, playing the display in reverse time sequence, and playing the display at speeds faster or slower than real time.

9. The method of claim 1, wherein generating the 3D representation from telemetry data further comprises:
    parsing the telemetry data using an XML map;
    generating from the parsed telemetry data successive keyframes; and
    placing the successive keyframes in a video buffer.

10. A system for documenting collaboration to resolve a problem disclosed by telemetry data in the operation of a three dimensional (3D) complex at a particular remote location, comprising:
    means for generating from the telemetry data a 3D representation of the complex over a period of time defined by the telemetry data, the complex being comprised of one or more objects proximate to one another within the complex and the telemetry data being provided by one or more monitoring instruments recording events at the particular remote location serving as a locus for the three dimensional complex, said representation being a dynamic 3D representation showing interactions between and among said one or more objects during said period of time;

means for providing for each of a plurality of collaborators a 3D perspective chosen by each respective collaborator from which to view the 3D representation, each said chosen perspective being a directional orientation from a chosen location within the 3D representation, each collaborator having an expertise with respect to the problem being modeled in three spatial dimensions over time by the representation, each collaborator being able to change the chosen perspective and to move about within the 3D representation over said period of time;

means for enabling each collaborator to document said chosen perspective at a selected point in time during viewing of the 3D representation, said documentation including entry by the respective collaborator of notes pertaining to said problem at said selected point in time; and means for displaying the entered notes in sequential order during a subsequent viewing of the 3D representation, wherein decision makers informed by the notes of collaborators resolve the problem being modeled by the 3D representation.

11. The system of claim 10, further comprising means for designating one of said plurality of collaborators to control a display over time of the 3D representation.

12. The system of claim 11, further comprising means for provisioning each collaborator with a microphone and audio link enabling voice collaboration among the collaborators.

13. The system of claim 10, wherein additional notes are entered by a collaborator during a subsequent viewing of the 3D representation.

14. The system of claim 10, wherein the sequential order of notes is determined by a time stamp added to each note and referenced to a point in time within a duration of said telemetry data.

15. The system of claim 10, wherein the perspective from which a collaborator views the 3D representation is provided by a virtual camera.

16. The system of claim 10, wherein at least one collaborator is located remotely from another collaborator.

17. The system of claim 11, wherein control of said display over time includes one or more of: stopping the display, restarting the display, restarting the display at a designated point in time, playing the display in reverse time sequence, and playing the display at speeds faster or slower than real time.

18. The system of claim 10, wherein the means for generating the 3D representation from telemetry data further comprises:
means for parsing the telemetry data using an XML map;
means for generating from the parsed telemetry data successive keyframes; and
means for placing the successive keyframes in a video buffer.

19. A computer implemented system for documenting collaboration to resolve a problem disclosed by telemetry data in the operation of a three dimensional (3D) complex at a remote location, the system having a server with software modules stored thereon and a processor operable to execute the software modules, the software modules comprising:
first computer code for generating from the telemetry data a 3D representation of the complex over a period of time defined by the telemetry data, the complex being comprised of one or more objects proximate to one another within the complex and the telemetry data being provided by one or more monitoring instruments recording events at the particular remote location serving as a locus for the three dimensional complex, said representation being a dynamic 3D representation showing interactions between and among said one or more objects during said period of time;
second computer code for providing for each of a plurality of collaborators a 3D perspective chosen by each respective collaborator from which to view the 3D representation, each said chosen perspective being a directional orientation from a chosen location within the 3D representation, each collaborator having an expertise with respect to the problem being modeled in three spatial dimensions over time by the representation, each collaborator being able to change the chosen perspective and to move about within the 3D representation over said period of time;
third computer code for enabling each collaborator to document said chosen 3D perspective at a selected point in time during viewing of the representation, said documentation including entry by the respective collaborator of notes pertaining to said problem at said selected point in time; and
fourth computer code for displaying the entered notes in sequential order during a subsequent viewing of the 3D representation,
wherein decision makers informed by the notes of collaborators resolve the problem being modeled by the 3D representation.

20. The computer implemented system of claim 19, wherein one of said plurality of collaborators controls a display over time of the 3D representation.

21. The computer implemented system of claim 20, wherein each collaborator is provisioned with a microphone and audio link enabling voice collaboration among the collaborators.

22. The computer implemented system of claim 19, wherein additional notes are entered by a collaborator during a subsequent viewing of the 3D representation.

23. The computer implemented system of claim 19, wherein the sequential order of notes is determined by a time stamp added to each note and referenced to a point in time within a duration of said telemetry data.

24. The computer implemented system of claim 19, wherein the perspective from which a collaborator views the 3D representation is provided by a virtual camera.

25. The computer implemented system of claim 19, wherein at least one collaborator is located remotely from another collaborator.

26. The computer implemented system of claim 20, wherein control of said display over time includes one or more of: stopping the display, restarting the display, restarting the display at a designated point in time, playing the display in reverse time sequence, and playing the display at speeds faster or slower than real time.

27. The computer implemented system of claim 10, wherein first computer code for generating the 3D representation from telemetry data further comprises:
fifth computer code for parsing the telemetry data using an XML map;
sixth computer code for generating from the parsed telemetry data successive keyframes; and
seventh computer code for placing the successive keyframes in a video buffer.

* * * * *